(12) United States Patent
Ficco (10) Patent No.: US 7,610,602 B2
(45) Date of Patent: Oct. 27, 2009

(54) METHOD, SYSTEM AND COMPUTER PROGRAM PRODUCT FOR AIRCRAFT MULTIMEDIA DISTRIBUTION

(75) Inventor: Michael Ficco, Silver Spring, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1773 days.

(21) Appl. No.: 09/978,452

(22) Filed: Oct. 17, 2001

(65) Prior Publication Data

US 2002/0178451 A1 Nov. 28, 2002

Related U.S. Application Data

(60) Provisional application No. 60/292,863, filed on May 23, 2001.

(51) Int. Cl.
*H04N 7/18* (2006.01)
(52) U.S. Cl. .................. 725/76; 725/75; 725/77; 725/79; 725/82
(58) Field of Classification Search ............... 725/76, 725/77, 75, 79, 82
See application file for complete search history.

(56) References Cited

U.S. PATENT DOCUMENTS

| | | | | |
|---|---|---|---|---|
| 5,565,908 A | * | 10/1996 | Ahmad | 725/93 |
| 5,579,308 A | * | 11/1996 | Humpleman | 370/352 |
| 5,724,521 A | * | 3/1998 | Dedrick | 705/26 |
| 5,835,127 A | * | 11/1998 | Booth et al. | 725/76 |
| 5,838,314 A | * | 11/1998 | Neel et al. | 725/8 |
| 5,959,596 A | * | 9/1999 | McCarten et al. | 345/2.1 |
| 6,028,600 A | * | 2/2000 | Rosin et al. | 715/718 |
| 6,047,165 A | * | 4/2000 | Wright et al. | 455/66.1 |
| 6,249,913 B1 | * | 6/2001 | Galipeau et al. | 725/76 |
| 6,353,699 B1 | * | 3/2002 | Schwab | 386/46 |
| 2001/0032028 A1 | * | 10/2001 | Volpe et al. | 700/94 |
| 2001/0037360 A1 | * | 11/2001 | Ekkel | 709/203 |

* cited by examiner

*Primary Examiner*—John W Miller
*Assistant Examiner*—Sumaiya A Chowdhury (57) ABSTRACT

A method, system and computer program product for aircraft multimedia distribution, including a multimedia server provided within an aircraft of an airline and a multimedia communications network within the aircraft coupled to the multimedia server. The multimedia server is configured to distribute, over the aircraft multimedia communications network, multimedia in-flight to a device of a passenger for at least one of viewing, listening and purchasing by the passenger.

55 Claims, 3 Drawing Sheets

METHOD, SYSTEM AND COMPUTER PROGRAM PRODUCT FOR AIRCRAFT MULTIMEDIA DISTRIBUTION

CROSS REFERENCE TO RELATED CASES

The present invention claims the benefit of priority under 35 U.S.C. §119(e) to U.S. Provisional Patent Application No. 60/292,863 of Ficco, entitled "AIRCRAFT MULTIMEDIA DISTRIBUTION SYSTEM," filed on May 23, 2001, the entire contents of which is incorporated by reference herein.

BACKGROUND OF THE INVENTION

1. Field of the Invention

The present invention generally relates to multimedia systems and more particularly to a method, system and computer program product for aircraft multimedia distribution.

2. Discussion of the Background

In recent years, as the speed and capabilities of processors, memories, video cards and the capacities of hard disks have increased, while prices for same have decreased, laptop computers have gained widespread use for performing non-traditional functions, such as video and audio streaming, etc. At the same time, the capability for airlines to provide high-quality video and audio streaming, etc., has not advanced as rapidly.

In the above respect, during a flight it is not uncommon for individual passengers to watch a DVD on his/her laptop. The large, high-quality laptop screen and high-tech headphones give such individuals a much better multimedia experience than that of others in the plane who, for example, typically pay $5 for the privilege of experiencing an in-flight movie on a distant 13" poorly color aligned TV screen. In addition, the in-flight movies are chosen by the airline and passengers may only choose to watch the in-flight movie or not.

Therefore, there is a need for a system and method that provide improved aircraft multimedia distribution in a cost-efficient manner and that allow passengers selection of multimedia for individual distribution.

SUMMARY OF THE INVENTION

The above and other needs are addressed by the present invention, which provides an improved method, system and computer program product for aircraft multimedia distribution. The system can provide pre-flight functions to a device, such as a laptop computer, personal digital assistant (PDA), etc., coupled to an airline Web server, in-flight functions when the device is coupled to the aircraft network and post flight functions via the aircraft network and the airline Web server.

Accordingly, in one aspect of the present invention there is provided an improved method, system and computer program product for aircraft multimedia distribution, including a multimedia server provided within an aircraft of an airline and a multimedia communications network within the aircraft coupled to the multimedia server. The multimedia server is configured to distribute, over the aircraft multimedia communications network, multimedia in-flight to a device of a passenger for at least one of viewing, listening and purchasing by the passenger.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A method, device and computer program product for aircraft multimedia distribution, are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Figures 1, 2, 3:
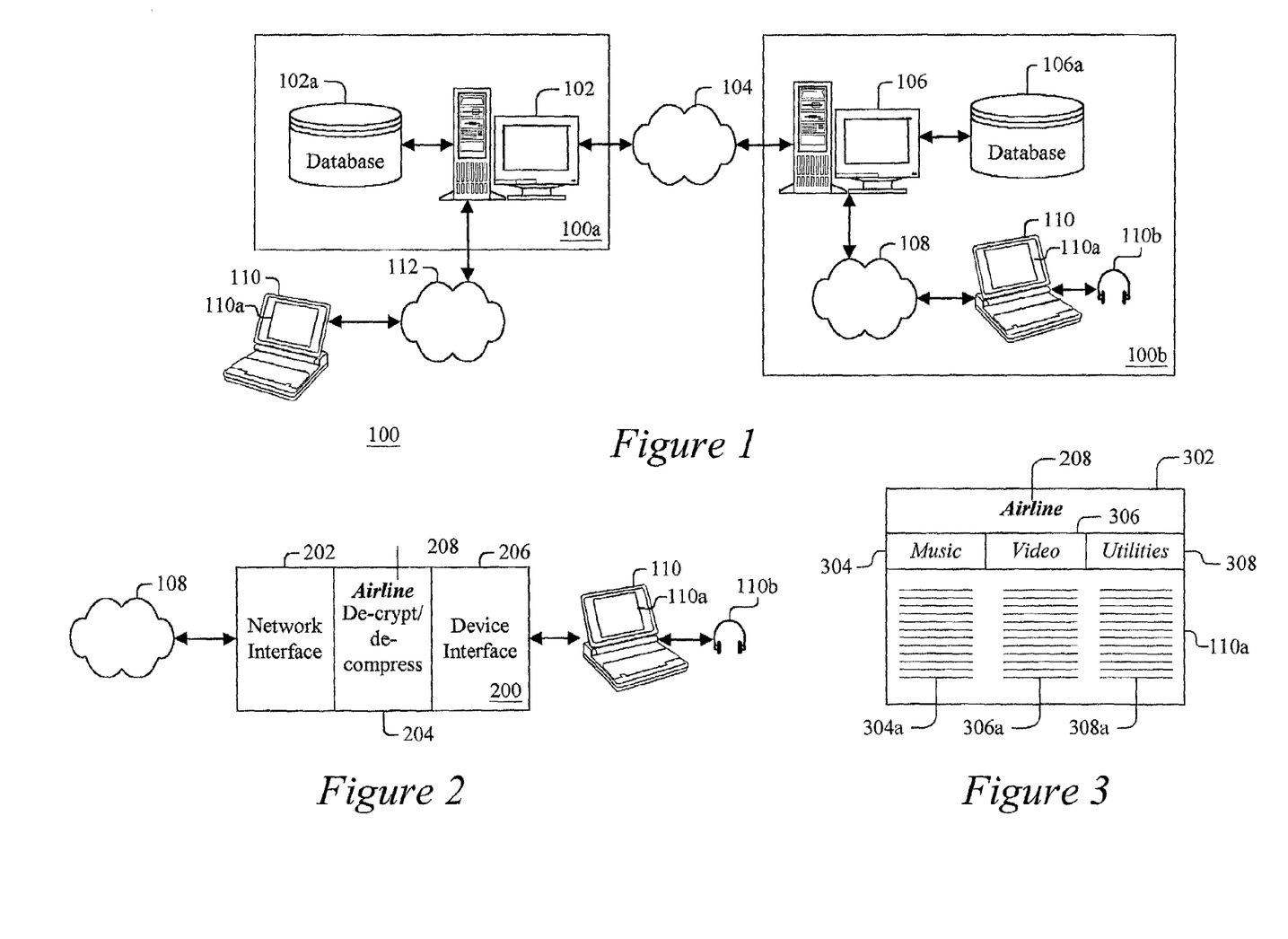
FIG. 1 is a top-level block diagram illustrating an aircraft multimedia distribution system, according to the present invention.
FIG. 2 is a block diagram illustrating a device for interfacing a device, such as a laptop computer, to a multimedia server of the system of FIG. 1, according to the present invention.
FIG. 3 is a diagram illustrating an exemplary in-flight multimedia selection menu or airline pre-flight Web site multimedia selection home page for the system 100 of FIG. 1, according to the present invention.

Referring now to the drawings, wherein like reference numerals designate identical or corresponding parts throughout the several views, and more particularly to FIG. 1 thereof, there is illustrated an aircraft multimedia distribution system 100, according to the present invention. In FIG. 1, the system 100 includes a multimedia server 106 and corresponding database 106*a* provided within an aircraft 100*b* of an airline and a multimedia communications network 108 (e.g., Ethernet, IEEE 1394, etc.) within the aircraft 100*b* coupled to the multimedia server 106. The multimedia server 106 is configured to distribute, over the aircraft multimedia communications network 108, multimedia in-flight to one or more devices 110 of passengers for at least one of viewing, listening and purchasing by the passenger. The device 110 includes a display 110*a* and headphones 110*b* for viewing and/or listening to the distributed multimedia.

The system 100 may further include an airline server 102 (e.g., an airline Web site) and corresponding database 102*a* coupled to the multimedia server 106 via a server communications network 104 (e.g, an Intranet, the Internet, satellite network, etc.) and configured to transmit, over the server communications network 104, the multimedia to the multimedia server 106. The airline server 102 is configured to communicate with the device 110 of the passenger via a passenger communications network 112 (e.g., the Internet, satellite network, etc.) to provide pre-flight functions with respect to the in-flight multimedia distribution.

The system 100 can provide pre-flight functions to the device 110, such as a laptop computer, personal digital assistant (PDA), etc., coupled to the airline server 102 via the communications network 112, in-flight functions when the device 110 is coupled to the aircraft network 108 and post flight functions via the aircraft network 108 and/or the airline server 102. The multimedia that may be distributed to the device 110 via the system 100 may include, for example, streaming or download video files (e.g., Real Video files, Windows Media files, DivX files, mpeg files, mpeg2 files, *.rm files, *.avi files, *.mpg files, etc.), streaming or download music files (e.g., Real Audio files, Windows Media files, MP3 files, *.wma files, *.ra files, *.wav files, etc.), software files, shareware files, freeware files, game files, *.zip files, *.exe files, served software applications (e.g., word processors, spreadsheets, games, video editing, music editing, etc.), sports statistics, trivia, encyclopedia information, etc.

The systems 102, 106 and 110 communicate with each other using any suitable protocol, for example, TCP/IP via the communications networks 104, 108 and 112. The airline server 102 transfers the multimedia content to the multimedia server 106, which then may be stored in the database 106a. The multimedia server 106 serves the content to the applications of the device 110 via the communications network 108. The multimedia server 106 includes all software and hardware to, for example, provide user account maintenance, validation and access control level (ACL) information, a directory server where content and other information is kept, etc. The multimedia content may also be loaded into the multimedia server 106 via, for example, manual loading of DVDs, CD ROMs, etc., into a jukebox of the multimedia server 106 and/or via manual loading of files, etc., into the multimedia server 106.

Accordingly, the systems 102, 106 and 110 are any suitable servers, workstations, personal computers (PCs), personal digital assistants (PDAs), Internet appliances, other devices, etc., capable of performing the processes of the present invention. The systems 102, 106 and 110 may communicate with each other using any suitable protocol via communications networks 104, 108 and 112 and may be implemented using the computer system 501 of FIG. 5, for example.

It is to be understood that the system in FIG. 1 is for exemplary purposes only, as many variations of the specific hardware used to implement the present invention are possible, as will be appreciated by those skilled in the relevant art(s). For example, the functionality of the one or more of the systems 102 and 106 may be implemented via one or more programmed computers or devices. To implement such variations as well as other variations, a single computer (e.g., the computer system 501 of FIG. 5) may be programmed to perform the special purpose functions of, for example, the systems 102 and 106 shown in FIG. 1. On the other hand, two or more programmed computers or devices, for example as in shown FIG. 5, may be substituted for any one of the systems 102 and 106. Principles and advantages of distributed processing, such as redundancy, replication, etc., may also be implemented as desired to increase the robustness and performance of the system 100, for example.

The communications networks 104, 108 and 112 may be implemented via one or more communications networks (e.g., the Internet, an Intranet, a wireless communications network, a satellite communications network, a cellular communications network, a hybrid network, etc.), as will be appreciated by those skilled in the relevant art(s). In a preferred embodiment of the present invention, the communications networks 104, 108 and 112 preferably use electrical, electromagnetic, optical signals, etc., that carry digital data streams, as are further described with respect to FIG. 5.

FIG. 2 is a block diagram illustrating a network interface device 200 for interfacing the device 110 to the multimedia server 106 of the system of FIG. 1, according to the present invention. The multimedia server 106 is configured to distribute the multimedia in-flight to the device 110 of the passenger via the network interface device 200 coupled between the device 110 of the passenger and the multimedia communications network 108. In FIG. 2, the network interface device 200 may include a network interface function 202 (e.g., Ethernet interface, IEEE 1394 interface, etc.) for interfacing to the multimedia communications network 108, de-encryption/decompression function 204 for decrypting and/or decompressing any encrypted and/or compressed multimedia and a device side interface 206 for interfacing with the device 110.

The multimedia may be encrypted and/or compressed and the network interface device 200 may be a custom device, plug-in device (PCMCIA card, etc.), USB device, etc., configured to decrypt and/or decompress the multimedia via the encryption/decompression function 204. The network interface device may be of proprietary and/or specific to the airline and may include an airline logo or identification 208. The network interface device 200, for example, (i) may be bought, rented, subscribed to with an expiration, etc., by a passenger and include full access to all multimedia, (ii) may be given free to a passenger and include limited access to the multimedia, (iii) may include a standard PCMCIA card, USB port, etc. (e.g., for use with the limited access to the multimedia), and (iv) may include an airline specific or proprietary device (e.g., for use with the full access to the multimedia).

In another embodiment, the multimedia server 106 also may be configured to distribute the multimedia in-flight to the device 110 of the passenger via a software device (e.g., an airline-specific multimedia player, etc.) stored on the device 110 of the passenger either pre-flight via the airline server 102 or in-flight via the multimedia server 106. The multimedia may be encrypted and/or compressed and the software device may include a custom software device, plug-in software device, etc., configured decrypt and/or decompress the multimedia. The software device may be proprietary and/or specific to the airline. The software device, for example, (i) may be bought or rented by a passenger and include full access to all multimedia, (ii) may be given free to a passenger and include limited access to the multimedia, (iii) may include a standard software device (e.g., for use with the limited access to the multimedia), and (iv) may include an airline specific or proprietary software device (e.g., for use with the full access to the multimedia).

In either of the above embodiments, the full access to the multimedia may be provide without any advertisements included therein, while the limited access to the multimedia may be provided with advertisements included therein. The advertisements may be targeted to a specific passenger via a multimedia purchasing/viewing history for the specific passenger stored in the database 106a of the multimedia server 106.

The multimedia server 106 is, for example, configured to distribute simultaneously the multimedia in multiple streams to the device 110 of the passenger. In addition, the airline server may include a pre-flight Web site multimedia selection home page. Accordingly, FIG. 3 is a diagram illustrating an exemplary in-flight multimedia selection menu and/or airline pre-flight Web site multimedia selection home page 302 for the system 100 of FIG. 1, according to the present invention.

With the in-flight multimedia selection menu 302, the multimedia server 106 is configured to provide a menu on the display 110 of the device 110 of the passenger for selection of one or more of the multiple streams of the multimedia. Such a menu 302 may include the airline logo 208, one or more multimedia categories, such as music (e.g., including the corresponding streaming or download music files 304a), video (e.g., including the corresponding streaming or download video files 306a), utilities (e.g., including the corresponding served software, streaming or download software, shareware, freeware, other files, 308a), etc., selection submenus 304-308.

Similar functions to the above-noted functions may be provided via the airline pre-flight Web site multimedia selection home page 302. In this embodiment, the passenger visits the airline server 102 and the airline server 102 displays the pre-flight Web site multimedia selection home page 302 on the device 110 of the passenger via the communications network 112. The passenger may than select multimedia to be distributed in-flight and/or download the custom software device, plug-in software device, etc., configured decrypt and/or decompress the in-flight multimedia. The page 302 may also present movie trailers, music clips, software demos, etc., to aid in the multimedia selection.

Figure 4:
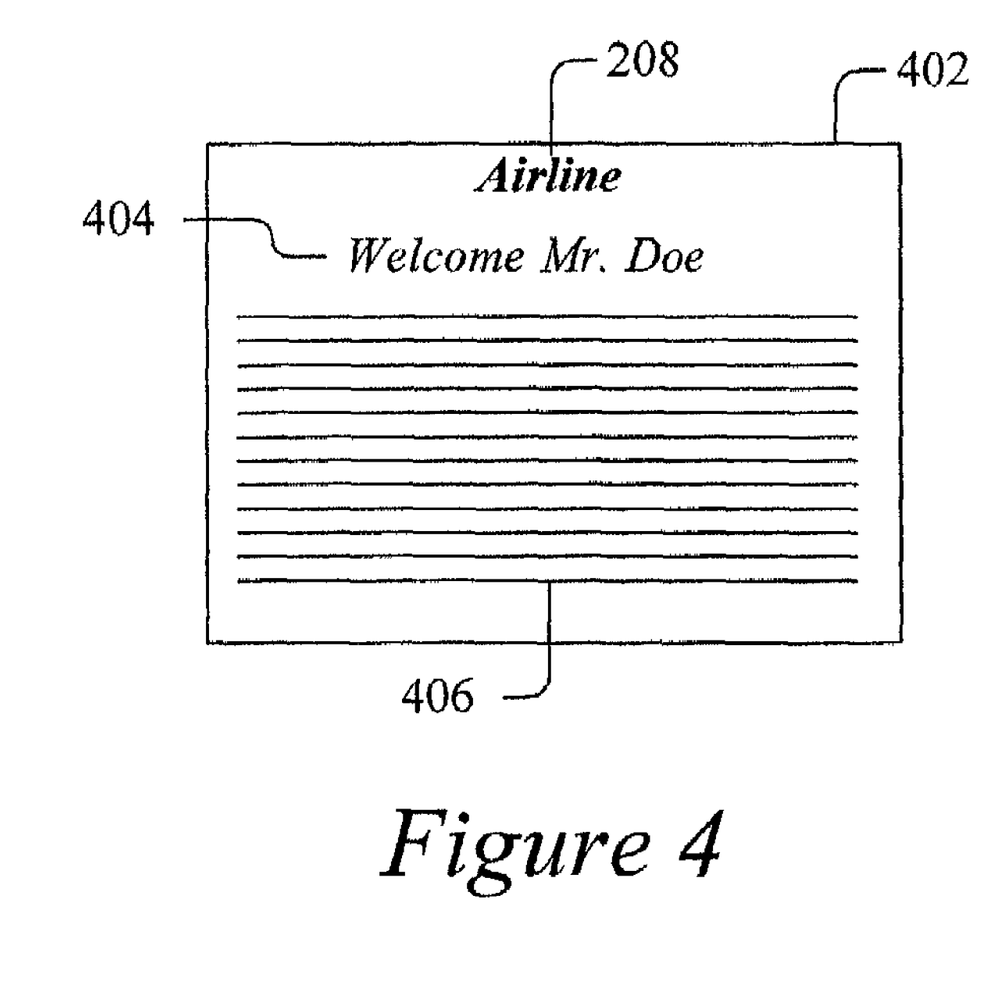
FIG. 4 is a diagram illustrating an exemplary advertisement included in in-flight movie and/or a pre-flight advertisement displayed at an airline Web site in the system of FIG. 1, according to the present invention.

FIG. 4 is a diagram illustrating an exemplary advertisement 406 included in in-flight movie 402 and/or a pre-flight advertisement 406 displayed at an airline Web site page 402 in the system of FIG. 1, according to the present invention. The in-flight movie 402 may include the advertisement 406 and/or a welcome message 404 specific to given passenger based on the a multimedia purchasing/viewing history for the specific passenger stored in the database 106a of the multimedia server 106. The advertisement may be included at the beginning and/or end of the in-flight movie 402 and/or any multimedia distribution. The in-flight movie may include the airline logo 208 in a portion of the display 110 of the device 110 where the in-flight movie is not displayed. The pre-flight advertisement 406 may be displayed on the display 110 of the device 110 via the airline Web site page 402 in a similar manner as described above, according to the present invention.

The present invention further includes post-flight functions provided to the device 110 via the multimedia server 106 and/or a Web site of the airline server 102. The post-flight functions provided may, for example, include multimedia selection and organization for post-flight distribution of purchased multimedia to a passenger (e.g., via direct download to the device 110 via the network 108, via a token-voucher system for download via the airline server 102 or for mailing of the multimedia via DVD or CD ROM, etc.).

The present invention further includes orchestration between an airline and a multimedia content provider. In this respect, the content provider may uniquely encrypt the multimedia (e.g., first run movies, etc.) for each airline. The multimedia may be further configured, arranged and/or targeted for specific passengers via the multimedia purchasing/viewing histories for the specific passengers stored in the database 106a of the multimedia server 106. The multimedia may include various pricing tiers (e.g., no advertisement pricing, with advertisement pricing, full access pricing, limited access pricing, etc.).

The present invention stores information relating to various processes described herein. This information is stored in one or more memories, such as a hard disk, optical disk, magneto-optical disk, RAM, etc. One or more databases, such as the databases 102a and 106a and a database within the device 110, etc., may store the information used to implement the present invention. The databases are organized using data structures (e.g., records, tables, arrays, fields, graphs, trees, and/or lists) contained in one or more memories, such as the memories listed above or any of the storage devices listed below in the discussion of FIG. 5, for example.

The previously described processes include appropriate data structures for storing data collected and/or generated by the processes of the system 100 of FIG. 1 in one or more databases thereof. Such data structures accordingly will includes fields for storing such collected and/or generated data. In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology. Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

All or a portion of the invention (e.g., as described with respect to FIGS. 1-4) may be conveniently implemented using one or more conventional general purpose computers, microprocessors, digital signal processors, micro-controllers, etc., programmed according to the teachings of the present invention (e.g., using the computer system of FIG. 5), as will be appreciated by those skilled in the computer art. Appropriate software can be readily prepared by programmers of ordinary skill based on the teachings of the present disclosure, as will be appreciated by those skilled in the software art. In addition, the present invention may be implemented on the World Wide Web (e.g., using the computer system of FIG. 5).

Figure 5:
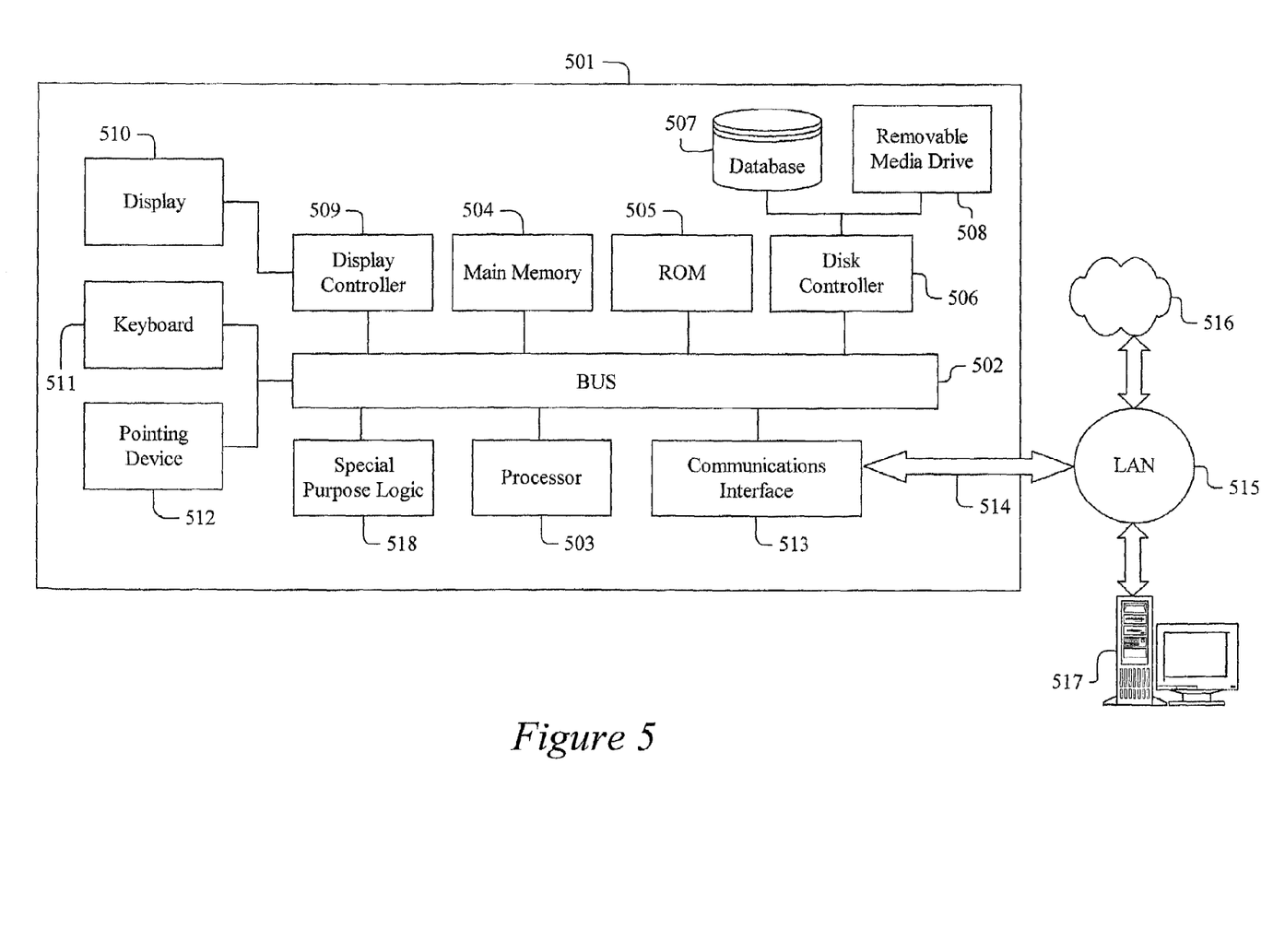
FIG. 5 is an exemplary computer system, which may be programmed to perform one or more of the processes of the present invention.

FIG. 5 illustrates a computer system 501 upon which the present invention (e.g., systems 102, 106, 110, etc.) can be implemented. The present invention may be implemented on a single such computer system, or a collection of multiple such computer systems. The computer system 501 includes a bus 502 or other communication mechanism for communicating information, and a processor 503 coupled to the bus 502 for processing the information. The computer system 501 also includes a main memory 504, such as a random access memory (RAM), other dynamic storage device (e.g., dynamic RAM (DRAM), static RAM (SRAM), synchronous DRAM (SDRAM)), etc., coupled to the bus 502 for storing information and instructions to be executed by the processor 503. In addition, the main memory 504 can also be used for storing temporary variables or other intermediate information during the execution of instructions by the processor 503. The computer system 501 further includes a read only memory (ROM) 505 or other static storage device (e.g., programmable ROM (PROM), erasable PROM (EPROM), electrically erasable PROM (EEPROM), etc.) coupled to the bus 502 for storing static information and instructions.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/ write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices 518, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, etc.

The computer system 501 may also include a display controller 509 coupled to the bus 502 to control a display 510, such as a cathode ray tube (CRT), liquid crystal display (LCD), active matrix display, plasma display, touch display, etc., for displaying or conveying information to a computer user. The computer system includes input devices, such as a keyboard 511 including alphanumeric and other keys and a pointing device 512, for interacting with a computer user and providing information to the processor 503. The pointing device 512, for example, may be a mouse, a trackball, a pointing stick, etc., or voice recognition processor, etc., for communicating direction information and command selections to the processor 503 and for controlling cursor movement on the display 510. In addition, a printer may provide printed listings of the data structures/information of the system shown in FIGS. 1-6, or any other data stored and/or generated by the computer system 501.

The computer system 501 performs a portion or all of the processing steps of the invention in response to the processor 503 executing one or more sequences of one or more instructions contained in a memory, such as the main memory 504. Such instructions may be read into the main memory 504 from another computer readable medium, such as a hard disk 507 or a removable media drive 508. Execution of the arrangement of instructions contained in the main memory 504 causes the processor 503 to perform the process steps described herein. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

Stored on any one or on a combination of computer readable media, the present invention includes software for controlling the computer system 501, for driving a device or devices for implementing the invention, and for enabling the computer system 501 to interact with a human user (e.g., a user of the systems 102, 106, 110, etc.). Such software may include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a digital subscriber line (DSL) card or modem, an integrated services digital network (ISDN) card, a cable modem, a telephone modem, etc., to provide a data communication connection to a corresponding type of telephone line. As another example, communication interface 513 may be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 513 sends and receives electrical, electromagnetic, or optical signals that carry digital data streams representing various types of information. Further, the communication interface 513 can include peripheral interface devices, such as a Universal Serial Bus (USB) interface, a PCMCIA (Personal Computer Memory Card International Association) interface, etc.

The network link 514 typically provides data communication through one or more networks to other data devices. For example, the network link 514 may provide a connection through local area network (LAN) 515 to a host computer 517, which has connectivity to a network 516 (e.g. a wide area network (WAN) or the global packet data communication network now commonly referred to as the "Internet") or to data equipment operated by service provider. The local network 515 and network 516 both use electrical, electromagnetic, or optical signals to convey information and instructions. The signals through the various networks and the signals on network link 514 and through communication interface 513, which communicate digital data with computer system 501, are exemplary forms of carrier waves bearing the information and instructions.

The computer system 501 can send messages and receive data, including program code, through the network(s), network link 514, and communication interface 513. In the Internet example, a server (not shown) might transmit requested code belonging an application program for implementing an embodiment of the present invention through the network 516, LAN 515 and communication interface 513. The processor 503 may execute the transmitted code while being received and/or store the code in storage devices 507 or 508, or other non-volatile storage for later execution. In this manner, computer system 501 may obtain application code in the form of a carrier wave. With the system of FIG. 5, the present invention may be implemented on the Internet as a Web Server 501 performing one or more of the processes according to the present invention for one or more computers coupled to the Web server 501 through the network 516 coupled to the network link 514.

The term "computer readable medium" as used herein refers to any medium that participates in providing instructions to the processor 503 for execution. Such a medium may take many forms, including but not limited to, non-volatile media, volatile media, transmission media, etc. Non-volatile media include, for example, optical or magnetic disks, magneto-optical disks, etc., such as the hard disk 507 or the removable media drive 508. Volatile media include dynamic memory, etc., such as the main memory 504. Transmission media include coaxial cables, copper wire, fiber optics, including the wires that make up the bus 502. Transmission media can also take the form of acoustic, optical, or electromagnetic waves, such as those generated during radio frequency (RF) and infrared (IR) data communications. As stated above, the computer system 501 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer connected to either of networks 515 and 516. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

The present invention allows airlines to distribute during flight multimedia for viewing, listening, and/or purchasing. The present invention recognizes that aircraft passengers comprise a good movie viewing market, wherein such a "captive audience," especially during long flights, also presents an ideal multimedia distribution environment. The present invention tracks and stores viewing/purchasing preferences via the multimedia server 106 and the corresponding database 106a, thus, providing airlines with a new marketable asset. In addition, advertisements 406 may be included during any in-flight multimedia distribution or pre-flight multimedia selection according to the present invention, opening up possible co-marketing agreements that can provide novel revenue streams for an airline.

The present invention includes numerous advantages over current airline approaches to distributing movies in that, for example: (i) current approaches to enhancing in-flight multimedia typically require retrofitting an aircraft with new TVs or video displays, which is time consuming, expensive and may involve FAA safety issues, as compared to the present invention, (ii) many passengers are equipped with laptop and/or PDA multimedia technology, which easily couples to the multimedia server 106 and the network 108, allowing delivery of in-flight multimedia according to the present invention, (iii) there is a significant revenue opportunity since passengers may willingly pay additional money for a superior multimedia experience according to the present invention, and (iv) providing the high-speed multimedia distribution network 108 in the aircraft 100b opens open previously non-existent revenue opportunities according to the present invention.

Although the present invention is described in terms of applications in devices, such as laptop computers, PDAs, etc., the present invention is applicable to other devices, such as palmtop computers, moving pictures experts group (MPEG) audio layer 3 (MP3) players, cell phones, etc., as will be appreciated by those skilled in the relevant art(s).

While the present invention has been described in connection with a number of embodiments and implementations, the present invention is not so limited but rather covers various modifications and equivalent arrangements, which fall within the purview of the appended claims.

What is claimed is:

1. A system for aircraft multimedia distribution, comprising:
   a multimedia server provided within an aircraft of an airline; and
   a multimedia communications network within said aircraft coupled to said multimedia server; and
   wherein said multimedia server is configured to distribute, over said aircraft multimedia communications network, multimedia in-flight to a device of a passenger, the multimedia being selected, pre-flight, for purchase via a web server coupled to the multimedia server.

2. The system of claim 1, wherein said multimedia comprises one of streaming video, streaming audio, video for download, audio for download, software, games, digital literary works, data, sports statistics, trivia, encyclopedia information, served software applications or graphical images.

3. The system of claim 1, wherein said device comprises one of a laptop computer, a palmtop computer, moving pictures experts group (MPEG) audio layer 3 (MP3) player, or a personal digital assistant (PDA).

4. The system of claim 1, wherein said multimedia communications network comprises one of an Ethernet communications network, or an IEEE 1394 communications network.

5. The system of claim 1, wherein said multimedia server is configured to distribute said multimedia in-flight to said device of said passenger via a network interface device coupled between said device of said passenger and said multimedia communications network.

6. The system of claim 5, wherein said multimedia is encrypted or compressed, and
   said network interface device comprises one of a custom device or plug-in device configured to decrypt or decompress said multimedia.

7. The system of claim 5, wherein said network interface device is one of proprietary or specific to said airline.

8. The system of claim 1, wherein said multimedia server is configured to distribute said multimedia in-flight to said device of said passenger via software device stored on said device of said passenger.

9. The system of claim 8, wherein said multimedia is encrypted or compressed, and
   said software device comprises one of a custom software device or plug-in software device configured to decrypt or decompress said multimedia.

10. The system of claim 8, wherein said software device is specific to said airline.

11. The system of claim 1, wherein said multimedia server is configured to distribute simultaneously said multimedia in multiple streams to said device of said passenger.

12. The system of claim 11, wherein said multimedia server is configured to provide a menu on said device of said passenger for selection of one or more of said multiple streams of said multimedia.

13. The system of claim 1, further comprising:
an airline server coupled to said multimedia server via a server communications network and configured to transmit, over said server communications network, said multimedia to said multimedia server.

14. The system of claim 13, wherein said airline server is configured to communicate with said device of said passenger via a passenger communications network to provide pre-flight functions with respect to the in-flight multimedia distribution.

15. The system of claim 14, wherein said passenger communications network comprises the Internet.

16. The system of claim 14, wherein said pre-flight functions comprise one of selection of said multimedia for in-flight distribution, previewing of said multimedia for said in-flight distribution, or downloading of a software device to enable said in-flight distribution of said multimedia.

17. The system of claim 16, wherein said software device is one of proprietary or specific to said airline.

18. The system of claim 13, wherein said airline server is configured to communicate with said device of said passenger via a passenger communications network to provide post-flight functions with respect to the in-flight multimedia distribution.

19. The system of claim 18, wherein said post-flight functions comprise organizing said multimedia for selection by said passenger.

20. The system of claim 13, wherein said airline server is configured to provide copies of said multimedia to said passenger on one of CD ROM, DVD or video CD (VCD) based on a selection by said passenger.

21. The system of claim 13, wherein said airline server is configured to provide copies of said multimedia to said passenger via download to said device of said passenger based on a selection by said passenger.

22. The system of claim 1, wherein said multimedia server is configured to store passenger-specific information relating to one of a multimedia selection history for said passenger or demographic information for said passenger.

23. The system of claim 22, wherein said multimedia server is configured to distribute said multimedia based on said passenger-specific information.

24. The system of claim 22, wherein said multimedia server is configured to distribute passenger-specific advertisements included in said multimedia based on said passenger-specific information.

25. The system of claim 24, wherein said advertisements are provided to said airline as part of a co-marketing agreement.

26. The system of claim 22, wherein said passenger-specific information is provided to said airline as a new marketable asset.

27. A method for aircraft multimedia distribution, comprising:
providing a multimedia server within an aircraft of an airline; and
coupling a multimedia communications network within said aircraft to said multimedia server; and
distributing, via said multimedia server, over said aircraft multimedia communications network, multimedia in-flight to a device of a passenger, the multimedia being selected, pre-flight, for purchase via a web server coupled to the multimedia server.

28. The method of claim 27, wherein said multimedia comprises one of streaming video, streaming audio, video for download, audio for download, software, games, digital literary works, data, sports statistics, trivia, encyclopedia information, served software applications or graphical images.

29. The method of claim 27, wherein said device comprises one of a laptop computer, a palmtop computer, moving pictures experts group (MPEG) audio layer 3 (MP3) player, or a personal digital assistant (PDA).

30. The method of claim 27, wherein said multimedia communications network comprises one of an Ethernet communications network, or an IEEE 1394 communications network.

31. The method of claim 27, further comprising:
distributing, via said multimedia server, said multimedia in-flight to said device of said passenger via a network interface device coupled between said device of said passenger and said multimedia communications network.

32. The method of claim 31, further comprising:
encrypting or compressing said multimedia,
wherein said network interface device comprises one of a custom device or plug-in device configured to decrypt or decompress said multimedia.

33. The method of claim 31, wherein said network interface device is one of proprietary or specific to said airline.

34. The method of claim 27, further comprising:
distributing, via said multimedia server, said multimedia in-flight to said device of said passenger via software device stored on said device of said passenger.

35. The method of claim 34, further comprising:
encrypting or compressing said multimedia,
wherein said software device comprises one of a custom software device or plug-in software device configured to decrypt or decompress said multimedia.

36. The method of claim 34, wherein said software device is specific to said airline.

37. The method of claim 27, further comprising:
distributing simultaneously, via said multimedia server, said multimedia in multiple streams to said device of said passenger.

38. The method of claim 37, further comprising:
providing via said multimedia server, a menu on said device of said passenger for selection of one or more of said multiple streams of said multimedia.

39. The method of claim 27, further comprising:
transmitting, via an airline server coupled to said multimedia server via a server communications network, said multimedia to said multimedia server.

40. The method of claim 39, further comprising:
communicating, via said airline server, with said device of said passenger via a passenger communications network to provide pre-flight functions with respect to the in-flight multimedia distribution.

41. The method of claim 40, wherein said passenger communications network comprises the Internet.

42. The method of claim 40, wherein said pre-flight functions comprise one of selection of said multimedia for in-flight distribution, previewing of said multimedia for said in-flight distribution, or downloading of a software device to enable said in-flight distribution of said multimedia.

43. The method of claim 42, wherein said software device is one of proprietary or specific to said airline.

44. The method of claim 39, further comprising:
communicating, via said airline server, with said device of said passenger via a passenger communications network to provide post-flight functions with respect to the in-flight multimedia distribution.

45. The method of claim 44, wherein said post-flight functions comprise organizing said multimedia for selection by said passenger.

46. The method of claim 39, further comprising:
providing, via said airline server, copies of said multimedia to said passenger on one of CD ROM, DVD or video CD (VCD) based on a selection by said passenger.

47. The method of claim 39, further comprising:
providing, via said airline server, copies of said multimedia to said passenger via download to said device of said passenger based on a selection by said passenger.

48. The method of claim 27, further comprising:
storing, via said multimedia server, passenger-specific information relating to one of a multimedia selection history for said passenger or demographic information for said passenger.

49. The method of claim 48, further comprising:
distributing, via said multimedia server, said multimedia based on said passenger-specific information.

50. The method of claim 48, further comprising:
distributing, via said multimedia server, passenger-specific advertisements included in said multimedia based on said passenger-specific information.

51. The method of claim 50, further comprising:
providing said advertisements to said airline as part of a co-marketing agreement.

52. The method of claim 48, further comprising:
providing said passenger-specific information is to said airline as a new marketable asset.

53. A system for aircraft multimedia distribution, comprising:
means for providing a multimedia server within an aircraft of an airline; and
means for coupling a multimedia communications network within said aircraft to said multimedia server; and
means for distributing, via said multimedia server, over said aircraft multimedia communications network, multimedia in-flight to a device of a passenger, the multimedia being selected, pre-flight, for purchase via a web server coupled to the multimedia server.

54. A method for receiving multimedia, comprising:
accessing a multimedia server over a communications network within an aircraft;
displaying a menu of options corresponding to a plurality of multimedia;
selecting, pre-flight, one of the options for purchase of a corresponding one of the plurality of multimedia via a web server coupled to the multimedia server; and
receiving the corresponding one of the plurality of multimedia transmitted over the communications network by the multimedia server.

55. The method of claim 54, wherein the web server is resident within a data network that is different from the communications network.

* * * * *